United States Patent [19]

Kuzuoka et al.

[11] Patent Number: 5,600,296
[45] Date of Patent: Feb. 4, 1997

[54] THERMISTOR HAVING TEMPERATURE DETECTING SECTIONS OF SUBSTANTIALLY THE SAME COMPOSITION AND DIMENSIONS FOR DETECTING SUBTANTIALLY IDENTICAL TEMPERATURE RANGES

[75] Inventors: Kaoru Kuzuoka, Toyota; Sotoo Takahashi, Okazaki; Masamichi Shibata, Toyota; Susumu Shibayama, Kariya, all of Japan

[73] Assignee: Nippondenso Co., Ltd., Kariya, Japan

[21] Appl. No.: 323,227

[22] Filed: Oct. 14, 1994

[30] Foreign Application Priority Data

| Oct. 14, 1993 | [JP] | Japan | 5-256888 |
| Dec. 21, 1993 | [JP] | Japan | 5-322351 |
| Jan. 31, 1994 | [JP] | Japan | 6-009251 |
| Feb. 15, 1994 | [JP] | Japan | 6-018091 |

[51] Int. Cl.⁶ .................................................... H01C 7/10
[52] U.S. Cl. ..................... 338/22 R; 338/195; 338/307; 338/34
[58] Field of Search ..................... 338/22 R, 22 SD, 338/25, 28, 34, 306, 307, 308, 195

[56] References Cited

U.S. PATENT DOCUMENTS

| 4,041,440 | 8/1977 | Davis et al. | 338/195 |
| 4,779,458 | 10/1988 | Mawardi | 374/41 |
| 4,818,363 | 4/1989 | Bayha et al. | 338/34 |
| 5,199,791 | 4/1993 | Kasanami et al. | 338/25 X |
| 5,406,246 | 4/1995 | Friese et al. | 338/22 R |
| 5,410,291 | 4/1995 | Kuzuoka | 338/22 R |
| 5,432,375 | 7/1995 | Agnvall et al. | 257/467 |

FOREIGN PATENT DOCUMENTS

| 51-140669 | 12/1976 | Japan . |
| 55-85001 | 6/1980 | Japan . |
| 55-106327 | 8/1980 | Japan . |
| 55-130236 | 9/1980 | Japan . |
| 3-10131 | 1/1991 | Japan . |
| 4-174319 | 6/1992 | Japan . |
| 5-34208 | 2/1993 | Japan . |

Primary Examiner—Teresa J. Walberg
Assistant Examiner—Raphael Valencia
Attorney, Agent, or Firm—Cushman Darby & Cushman IP Group of Pillsbury Madison & Sutro LLP

[57] ABSTRACT

A thermistor type temperature sensor having a substrate made from an electrically insulating ceramic plate. A thin or thick film detecting resistor is printed on the substratum. A thick or thin film pull-up resistor may also be printed on the substratum, and trimming of the resistors is possible. The ratio of B-constant values for the detecting resistor and the pull-up resistor may be selected so that it is locate between 0.4 to 0.9 or 1.1 to 1.5. The detecting resistor may be constructed from thermistor sections of the same composition and the sections may be connected in parallel or in series. The thermistor sensor can be connected to the pipe through which a gas passes. When the sensor is connected to the pipe, the angle of the measuring plane may be adjusted, so that a precise measurement can be obtained.

7 Claims, 12 Drawing Sheets

THERMISTOR HAVING TEMPERATURE DETECTING SECTIONS OF SUBSTANTIALLY THE SAME COMPOSITION AND DIMENSIONS FOR DETECTING SUBTANTIALLY IDENTICAL TEMPERATURE RANGES

BACKGROUND OF THE INVENTION

1. Field of the Invention

The present invention relates to a thermistor, which can be, for example, suitably mounted on an exhaust pipe of an internal combustion engine for detecting the temperature of an exhaust gas.

2. Description of Related Art

Known in the prior art is a temperature detector, including a temperature detecting element, which is used in an appliance such as a boiler or an internal combustion engine to detect the temperature of the hot water or exhaust gas. In Japanese Un-Examined Utility Model Publication No. 55-130236, a device, which includes a sensor unit arranged in an exhaust pipe of an internal combustion engine, is provided for detecting the temperature of an exhaust gas or the temperature of a catalytic converter, and a module for detecting a temperature higher than a predetermined value causes an outside device to commence its designated operation. In this prior art, the output terminals of sensor are connected to the above-mentioned module directly. In other words, an independent connector is not used for obtaining an electric connection between the sensor and the module.

Furthermore, in Japanese Un-Examined Patent Publication No. 51-140669, a fixed resistor is connected in series with the output wire from the temperature detector in such a manner that a resistance value compensation function is provided when the temperature to be detected is high.

In short, in the prior art Japanese Un-Examined Utility Model Publication No. 55-130236 and in Japanese Un-Examined Patent Publication No. 51-140669, a function for controlling the output value is provided independent from the part which responds to the temperature to be detected. However, in these prior art, only an outside resistor is proved, which is not able to fully compensate for the variation in the value of the resistance of the resistor (thermistor) for detecting the temperature. Thus, the precision of the temperature measurement is reduced.

Furthermore, in another prior art, Japanese Un-examined Patent Publication No. 5-34208, a thermistor type of temperature detector, of a wide range measurement type, is disclosed. In this prior art, two thermistors having different thermistor-B-constants are connected in parallel so that the combined resistance value of the thermistors can vary over a wide range. In this case, in accordance with the temperature difference between a low temperature and a high temperature, the value of the resistance can be varied over a range of, for example 0.1 KΩ to 200 KΩ. In this case, a temperature sensing circuit, including a pull-up resistor, is provided for obtaining a voltage output corresponding to the detected temperature. However, in the prior art, such a pull-up resistor is a fixed resistor type, and, therefore, with respect to a large change in the resistance value of the thermistor due to the change in the temperature, it is difficult to obtain the optimum value of the pull-up resistor to obtain the maximum change in the voltage level with respect to the change in the temperature. Thus, the precision of the temperature detector at a low or a high temperature region is reduced.

Furthermore, a usual thermistor-type sensor is a thermistor element constructed on a chip made of a ceramic plate, with electrodes formed thereon, and covered with a glass plate. This sensor is referred to herein as an A-type sensor. Also known is a B-type thermistor, where a thermistor element is embedded in a sheath, such as a metal pipe, such as those disclosed in a Japanese Examined Patent Publication No. 52-7535 and Japanese Un-Examined Patent Publication No. 50-118294.

Furthermore, in order to increase the speed of the temperature measurement response, the thermistor sensor of the A-type is improved in that a gap for allowing the temperature detecting element to contact the gas is used as disclosed in the Japanese Examined Patent Publication No. 52-7535. Japanese Un-Examined Utility Model Publication No. 5-34543 is improved further in that the metal sheath is flattened in order to increase the response speed. However, an arrangement of the temperature sensor with respect to the flow of the gas may adversely affect the response speed of the temperature measurement.

SUMMARY OF THE INVENTION

In view of the above, an object of the present invention is to provide a temperature sensor capable of overcoming the above-mentioned drawbacks in the prior arts.

Another object of the present invention is to provide a thermistor type temperature sensor capable of obtaining an increased precision in the measurement of the temperature.

According to a first aspect of the present invention, a thermistor type temperature sensor is provided, comprising:

a substrate plate made of electrically insulating ceramic material;

a thin or thick layer of a thermistor material constructing a detecting or first resistor, the resistance of which is varied in accordance with the temperature to be detected, and;

a thin or thick layer of a material constructing a trimmable second resistor for allowing a change in the resistance of the detecting resistor to be detected;

said first and second resistors being formed integrally on said substratum.

According to a second aspect of the present invention, a thermistor type temperature sensor is provided, comprising:

a substratum made of electric insulative material;

a thin or thick layer of a thermistor material constructing a detecting or first resistor, the resistance value of which is varied in accordance with the temperature to be detected, and;

a second resistor for allowing an output voltage to be produced, which indicates the change in the resistance value of the first resistor;

said first and second resistors being formed integrally on said substratum;

the thermistor B-constant ratio as a ratio of a B-constant value of the first resistor to the B-constant value of the second resistor being within a range between 0.4 to 0.9 or between 1.1 to 1.5.

According to a third aspect of the present invention, a thermistor type temperature sensor is provided, comprising:

a substratum plate made of electric insulative ceramic material;

a thin or thick layer of a thermistor material constructing a detecting resistor, the resistance of which is varied in accordance with the temperature to be detected;

electrodes connected to the detecting resistor for passing the electric signal corresponding to the detected temperature, and;

said resistor and electrodes being formed on the substratum;

said detecting resistor being constructed from a plurality of temperature detecting sections having the same compositions and connected in series, or in parallel, to the electrodes.

According to a fourth aspect of the present invention, an assembly is provided which includes a hollow body through which a gas passes and a temperature sensor connected to the body for detecting the temperature of the gas flowing in the body, wherein said sensor comprises:

a plate shaped temperature detecting element having a major plane to be contacted with the flow of the gas to be measured, and;

means for conducting an electric signal from the temperature detecting element, and wherein;

the assembly further comprises an attachment means for connecting the detecting element to the body, so that the major detecting plane forms an angle equal to or smaller than 45 degrees with respect to the flow of the gas to be detected.

DESCRIPTION OF THE PREFERRED EMBODIMENTS

Figure 1:
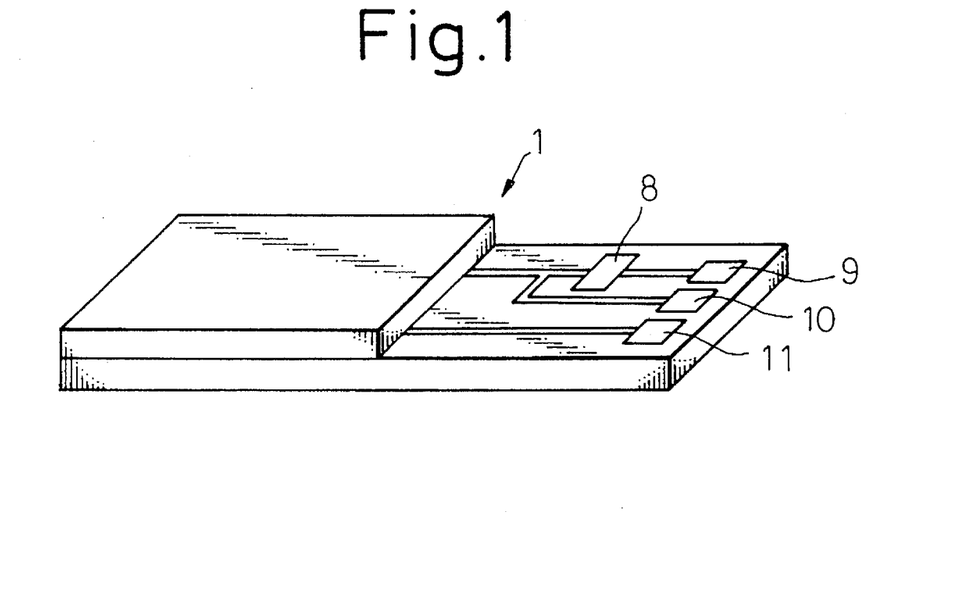
FIG. 1 is a schematic perspective view of a thermistor type temperature sensor according to the present invention.
Figure 2:
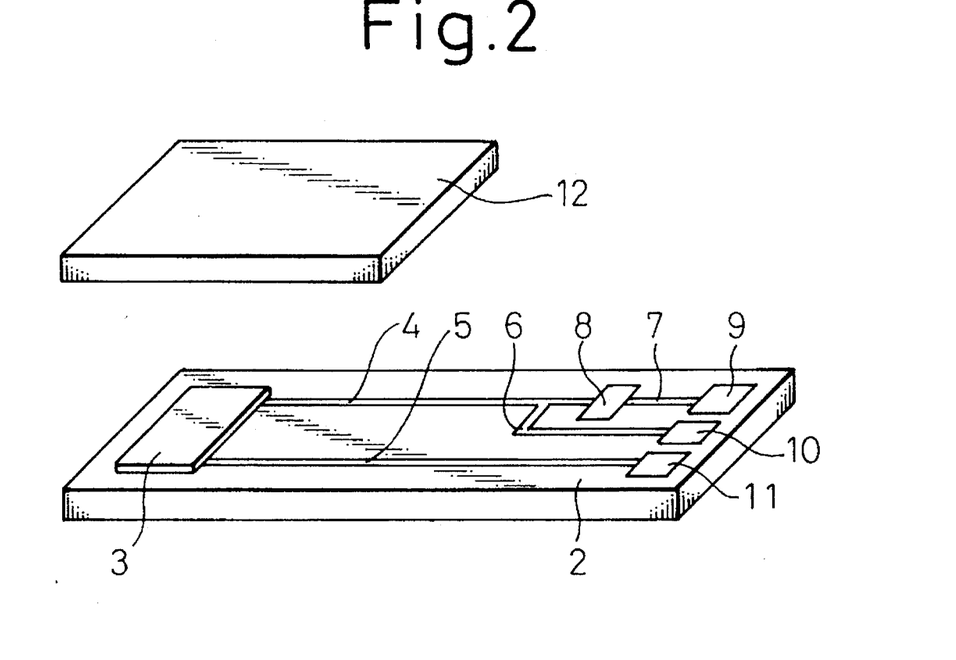
FIG. 2 is a schematic, dismantled perspective view of the sensor in FIG. 1.

Now, embodiments of the present invention will be explained with reference to the attached drawings. In FIG. 1, reference numeral 1 denotes a thermistor according to the present invention. As shown in FIG. 2, the thermistor 1 includes a substratum 2 made of, for example, a green sheet made of alumina. Then, a paste of a high temperature thermistor material such as an Mn-Cr based spinel is printed on the substratum 2 for creating a detecting resistor 3. Furthermore, a paste made of a high melting temperature precious metal such as Pt is printed on the substratum for creating lead electrodes 4 and 5, which are in an electrical connection with the resistor layer 3. Furthermore, a printing is done for creating a lead electrode 6, which is connected to the electrode 4, and a lead electrode 7, on which a pull-up resistor (output detecting resistor) 8 is created at the later stage, and a printing is also done to create terminal electrodes 9, 10 and 11. Next, an electric insulative plate 12, which is made as the same material as that of the substratum 2, is applied to the substratum plate 2, so that the element 3 as well as the electrodes are sandwiched between the plates 2 and 12, and are thermally integrally bonded with each other. The size of the plate 12 and the location of the plate 12 on the plate 2 are such that it can fully cover the resistor element 3 together with parts of the lead electrodes 4 and 5 extending from the resistor element 3. Then, the thermally bonded plates 2 and 12 are subjected to firing to fuse the plates with each other, and then, a paste made of a material providing an electrical resistance, such as a $RuO_2$ is printed at a desired location on the electrically insulating substratum 2, so that the above-mentioned pull-up resistor 8 is created on the substratum 2, which is followed by a heating process for fusing the elements together. In this case, it is preferable to select of the material for constructing the pull-up resistor 8 with respect to that for the detecting resistor 3 in such a manner that the heating temperature for the pull-up resistor 8 is smaller than that for the detecting resistor element 3.

Figure 4:
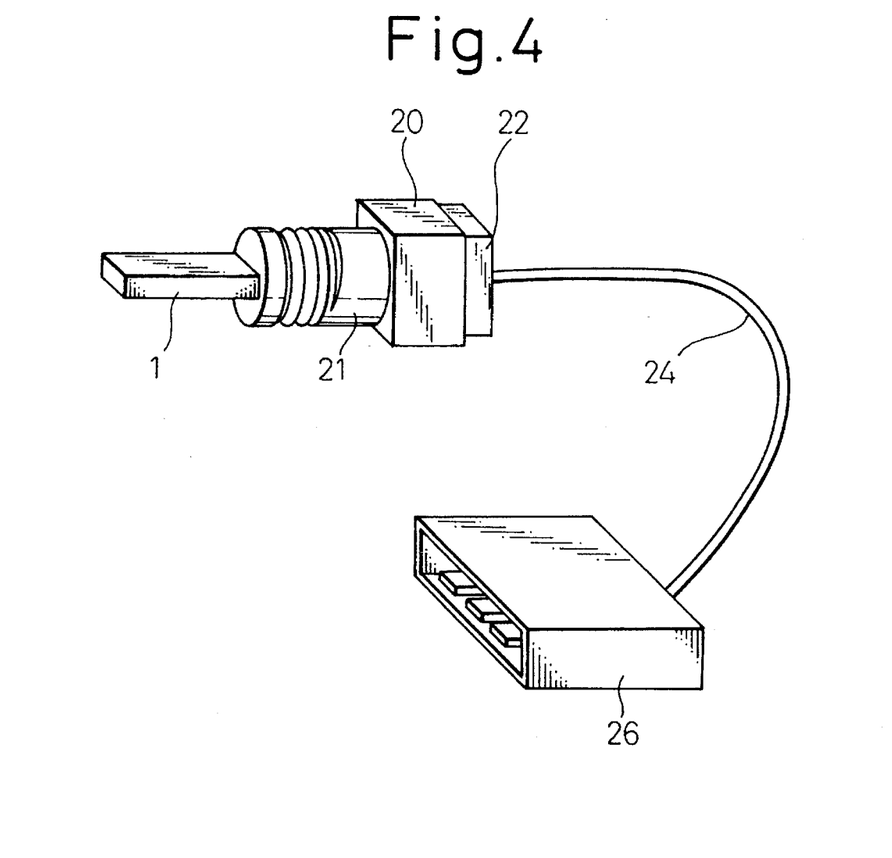
FIG. 4 is a schematic perspective view illustrating how the sensor in FIG. 1 is connected to its connector.

The thermistor type temperature sensor as constructed above 1 is, as shown in FIG. 4, connected to a metal housing 20 via a glass seal 21. Furthermore, a connector 22 has contacts (not shown) in connection with the terminals 9, 10 and 11 in FIG. 2. A sheathed electric cable 24 has therein lead wires having first ends connected to the respective contacts in the connector 22. The lead wires in the sheath of the cable 24 include second ends connected to a connector 26 at their respective contacts. The connector 26 is connected to the control circuit (a microcomputer) in which the temperature signal from the sensor is used.

The simultaneous heating process for the detecting resistor 3 as well as the electrical insulating substratum plates 2 and 12, followed by the sealing process, makes it impossible to adjust the value of the electric resistance after the execution of the above process. In other words, the detecting resistor 3 can have a large variation in its electrical resistance. However, according to the present invention, the pull-up resistor 8 for allowing the detection of the output, which is located outside the above-mentioned sealed portion, is formed as a thick or thin trimmable film, which allows the resistance value to be adjustable at a later trimming stage.

The trimming operation will now be explained. When the standard deviation of the value $R_3$ of the resistance of the detecting resistor 3 at a temperature T°(C.) is $\sigma_3$, the pull-up resistor 8 is formed such that its electrical resistance $R_8$ is equal to $R_3+4\times\sigma_3 \Omega$. When, after the firing process, the value of the resistance of the thermistor temperature sensor 1, as detected between the electrode terminals 10 and 11, at a temperature T°(C.) is expressed by $R_3+\Delta R$, trimming of the pull-up resistor 8 is done by using a device such as a YAG laser trimming device in such a manner that the value of the resistance $R_8$ of the pull-up resistor 8 is equal to $R_3+\Delta R \Omega$. Such a trimming operation allows the yield rate to increase due to the fact that the formation of the pull-up resistor 8 is such that its resistance value is $R_3+4\times\sigma_3 \Omega$.

Figure 5:
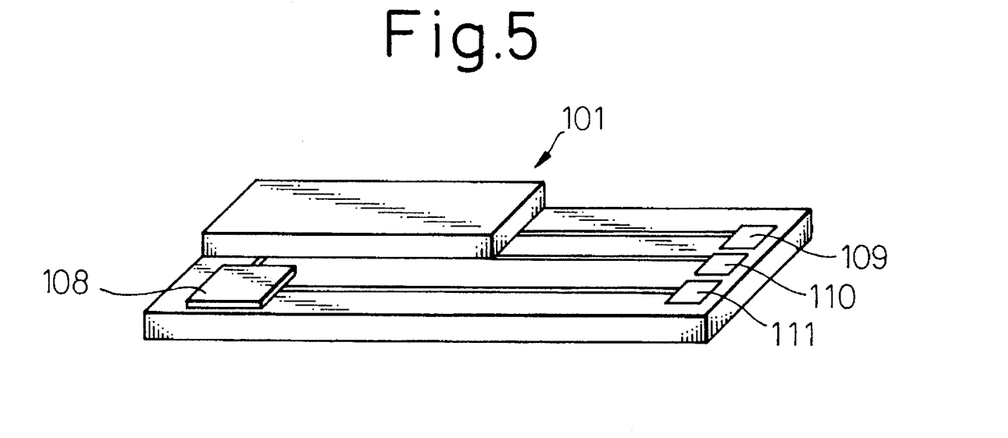
FIG. 5 is similar to FIG. 1 but illustrates a second embodiment.
Figure 6:
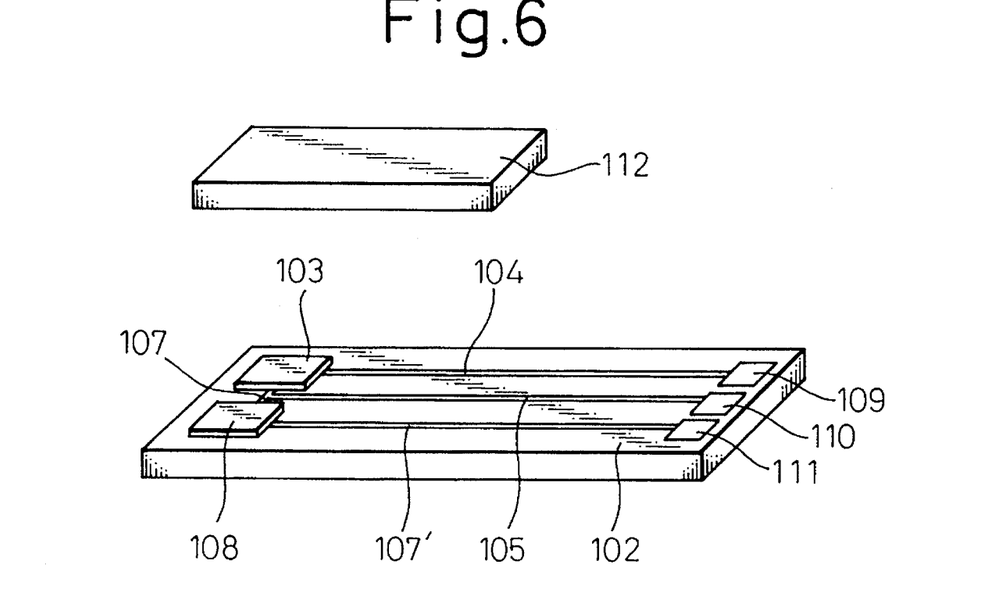
FIG. 6 is a schematic, dismantled perspective view of the sensor in FIG. 5.

In the above example, the measuring temperature may change the resistance value of the pull-up resistor 8. In order to reduce such a change, the modification shown in FIG. 5 causes the pull-up resistor 108 to be located at a position which is adjacent the sealed thermistor portion 101. In FIG. 5, reference numerals 109, 110 and 111 are electrodes corresponding to the electrodes 9, 10 and 11 in FIG. 1. As shown in FIG. 6, in this embodiment, the thermistor 101 is constructed from a substratum 102, on which a cover 112, made of the same material as that of the substratum, is bonded and then fired. The cover plate 112 only covers the detecting resistor 103 as well parts of the lead electrodes 104 and 105 extending from the resistor 103. From the resistor 103, a lead electrode 107 extends laterally and a lead electrode 107' extends longitudinally (parallel to the lead electrodes 104 and 105). A pull-up resistor 108 is located on the substratum 102 at a position between the lead electrodes 107 and 107'.

Figure 3:
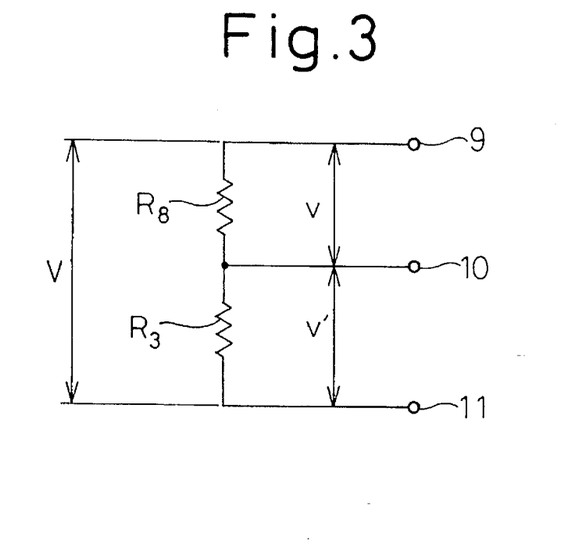
FIG. 3 is an electric circuit for generating an electric signal, indicating the temperature, from the sensor in FIG. 1.

In the above construction of the thermistor according to the present invention, the application of an electric voltage V across the electrodes 9 and 11 in the first embodiment (across the electrodes 109 and 111 in the second embodiment) causes an output voltage v across the electrodes 9 and 10 in the first embodiment (across the electrodes 109 and 110 in the second embodiment) which is, as will be easily understood from FIG. 3, expressed by $$v = \frac{R_8}{R_3+R_8} V, \quad (1)$$

where $R_3$ is a value of the electric resistance of the resistor 3 (103), while $R_8$ is the value of the electric resistance of the resistor 8 (108). However, the resistance value $R_8$ of the pull-up resistor 8 is trimmed so that it is equal to the value $R_3$ of the resistor detecting resistor 3 at the predetermined temperature T°C. Thus, the value of the output voltage v is always equal to 0.5 V at this predetermined temperature T°C. Namely, the capability of adjusting the output according to the present invention makes it possible to obtain a high precision thermistor type sensor. Furthermore, a compact construction of the thermistor type sensor 1 can be realized due to the fact that the detecting resistor 3 is formed as a thermistor, on one hand, and that the pull-up resistor 8 is integrally formed on the same substratum as that of the resistor 3, on the other hand.

Figure 8:
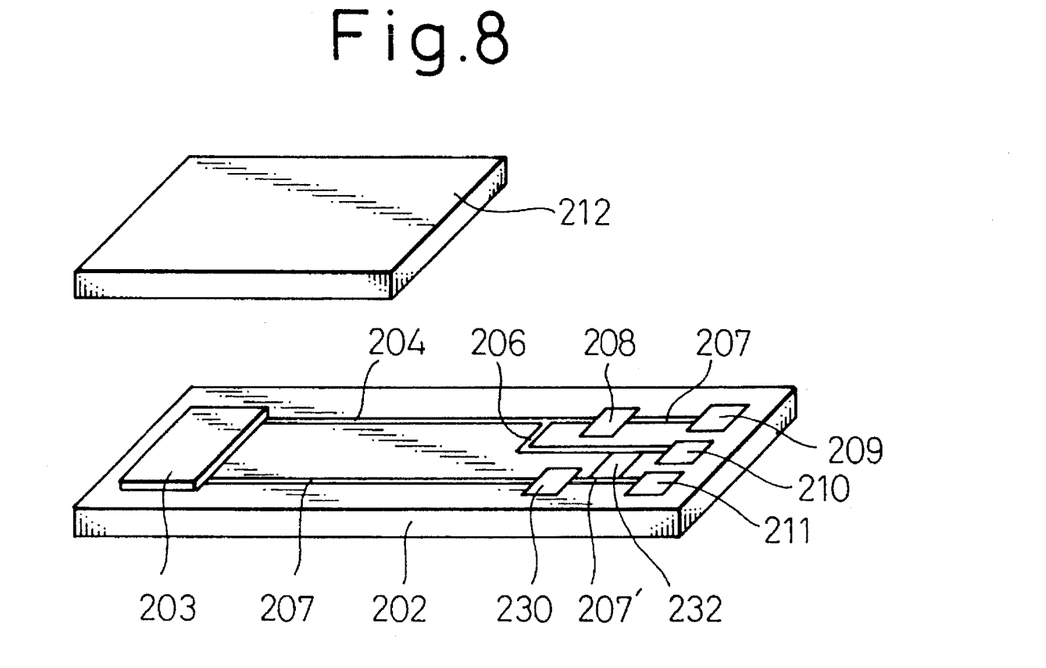
FIG. 8 is a schematic, dismantled perspective view of the sensor in FIG. 7.

In a second embodiment of the first invention shown in FIG. 8, a thermistor sensor 201 includes, in addition to the components corresponding to those in the first embodiment expressed by the same reference numeral plus 200, adjustment resistors 230 and 232. The adjustment resistor 230 is located between the electrode 207 and the electrode 207'. The second adjustment resistor 232 is located between the electrode 207' to the terminal 211 and the electrode 206 to the terminal 210.

In the first embodiment in FIGS. 1 and 2, application of a voltage between the terminal electrodes 9 and 10 causes the detecting resistor 3 to generate heat, which causes the temperature of the detecting resistor 8 to increase by an amount $\Delta T°(C.)$. As a result, the temperature value as issued from the pull-up resistor 8 is larger than the actual temperature. Namely, the output voltage v obtained by the pull-up resistor 8 is expressed by $$v = \frac{R_8}{(R_3+\Delta R_3)+R_8} V, \quad (2)$$

where $R_3$ is the value of the electric resistance of the resistor 3 at the temperature of T°(C.), $\Delta T°(C.)$ is the temperature increase caused by the application of the voltage V, $\Delta R_3$ is the resistance change caused by the temperature increase of $\Delta T°C.$, and $R_8$ is the value of the electric resistance of the resistor 8. Since the trimming of the resistance value is done so that $R_3=R_2$, the equation (2) becomes $$v = \frac{R_8}{2R_3+\Delta R_3} V = \frac{1}{2+\frac{\Delta R_3}{R_3}} V, \quad (3)$$

which equation means that a change in the output voltage v is obtained in accordance with the value of $\Delta R_3/R_3$, which causes the temperature as deviated by $\Delta T°(C.)$.

Figure 7:
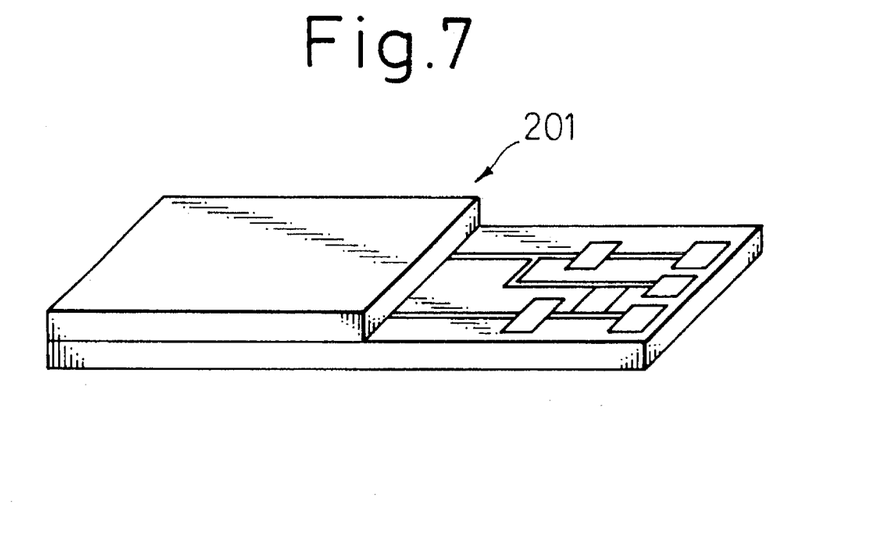
FIG. 7 is similar to FIG. 1 but illustrates a third embodiment.
Figure 9:
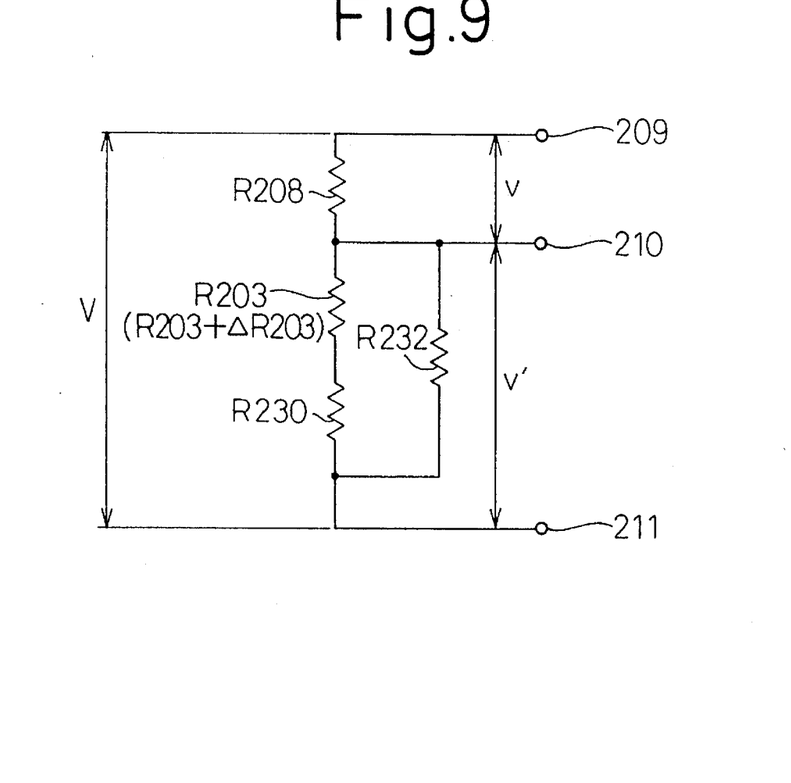
FIG. 9 is similar to FIG. 3 but illustrating the electric circuit for the embodiment in FIG. 7.

In view of the above difficulty, in the second embodiment shown in FIG. 7, between the terminal electrodes 209 and 211, the adjustment resistor 230 is arranged in series with the detecting resistor 203 and the pull-up connector 208, while the adjustment resistor 232 is arranged between the lead electrodes 206 and 207'. In this case, when a voltage V is applied across the terminal electrodes 209 and 211, the voltage from the pull-up resistor 208, i.e., the voltage v obtained between the terminal electrodes 209 and 210 is, as will be easily understood from the circuit shown in FIG. 9, expressed by $$v = \frac{R_{208}}{\frac{\{(R_{203}+\Delta R_{203})+R_{230}\}R_{232}}{(R_{203}+\Delta R_{203})+R_{230}}+R_{208}}, \quad (4)$$

where $R_{203}$ is the value of the resistance of the detecting resistor 203, $R_{208}$ is the value of the resistance of the pull-up resistor 208, $\Delta R_{203}$ is a change in the value of the detecting resistor 203, $R_{230}$ is a value of the resistance of the resistor 230, and $R_{232}$ is a value of the resistance of the resistor 232. Therefore, the values of the pull-up resistor 208 and the adjustment resistors 203 and 232 are trimmed by the YAG laser trimming device, so that the following conditions $$R_{230}=\Delta R_{203} \text{ and}$$

$$R_{232}=R_{203},$$

are obtained. In this case, the equation (4) becomes to $$v=\frac{2}{3} V,$$

thereby obtaining a constant relationship between the voltage V applied to the thermistor and a voltage v as detected by the thermistor. Thus, an increased precision in the detection of the temperature can be obtained.

In the above second embodiment of the first invention, a formation of the resistor $R_{232}$, to provide the same value of the resistor $R_3$ as in the first embodiment, allows the deviation in the resistance value of the resistor 203 to be reduced, thereby increasing yield rate.

Figure 10:
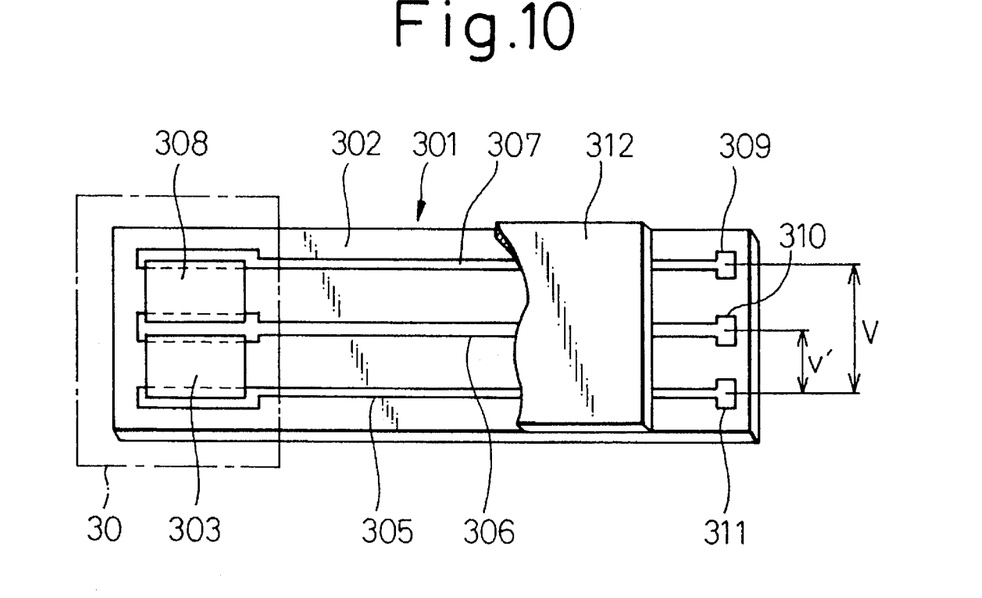
FIG. 10 is a schematic, partially exploded plan view of a sensor according to the present invention.

Now, a second aspect of the invention will be explained. Namely, FIG. 10 illustrates a thermistor 301 according to the second invention. The thermistor 301 in this embodiment is constructed on a substratum made of an electric insulative ceramic material, such as an alumina. Similar to the first invention, a temperature detecting resistor 303 and a pull-up resistor 308 are formed on the substratum 302. The temperature detecting resistor 303 is made from Mn-Cr based spinel, while the pull-up resistor 308 is made from $Cr_2O_3$-ZnO based material. The resistors 303 and 308 are connected in series between the lead electrodes 304 and 305 which are connected to the terminals 309 and 311, respectively. The lead electrode 306 from the resistors 303 and 308 extend to the terminal 310. These electrodes are made of a precious metal or a metal durable at a high temperature. A cover plate 312 made of an electric insulative ceramic material such as an alumina is connected to the base plate 302 in such a manner that the resistors 303 and 308 are sealed between the plate 302 and 312.

Similar to the first aspect of the invention, the production of the thermistor in FIG. 10 is such that, at a first stage, on a green sheet which will be used as an electric insulative ceramic plate, a paste of Mn-Cr based spinel for constructing the temperature measuring resistor 303, a paste of $Cr_2O_3$-ZnO based material for constructing the voltage detecting resistor 308, and a paste of precious metal or high temperature durable metal such as Pt for constructing the electrodes are printed, then, a cover plate 312 of an electric insulating ceramic material such as an alumina is placed on the base plate 302 to obtain an integrated plate, and, finally, firing of the integrated plate is done.

Similar to the first aspect of the invention, a voltage V is applied across the electrodes 309 and 311, i.e., across the series connected resistors 303 and 308. Unlike the first embodiment, a voltage v' across the detecting resistor 303, i.e., a voltage between the terminals 310 and 311 is measured. However, similar to the previous embodiments, the voltage v across the pull-up resistor, i.e., the voltage between the electrodes 309 and 310 can be detected. In this case, the voltage v' becomes $$v' = \frac{R_{303}}{R_{303} + R_{308}} V, \quad (5)$$

where $R_{303}$ is the value of the measuring detector 303 when the temperature is T°(C.) and $R_{308}$ is the value of the pull-up resistor 308 when the temperature is T°(C.).

Figure 11:
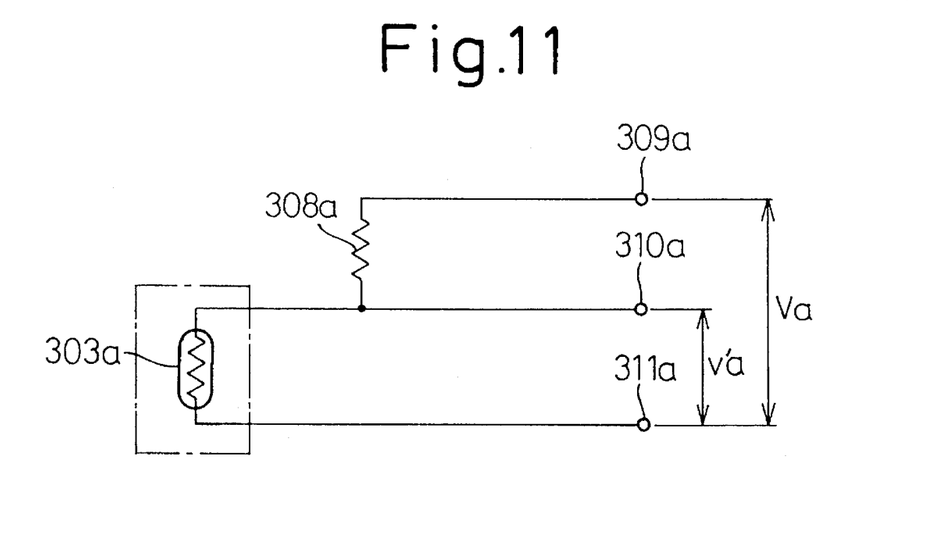
FIG. 11 is a construction of a thermistor type sensor in a prior art.

FIG. 11 illustrates the construction of a prior art temperature detection circuit. Namely, in the temperature measuring section, a temperature measuring resistor $303_a$ is arranged, to which a pull-up resistor $308_a$ is connected. When a voltage $V_a$ is applied between the terminals $309_a$ and $311_a$, an output voltage $v'_a$ obtained between the terminals $311_a$ and $310_a$ is $$v'_a = \frac{R_{303a}}{R_{303a} + R_{308a}} V_a, \quad (6)$$

where $R_{303a}$ is the value of the measuring detector $303_a$ when the temperature is T°(C.) and $R_{308a}$ is the value of the pull-up resistor $308_a$ when the temperature is T°(C.).

Figure 12:
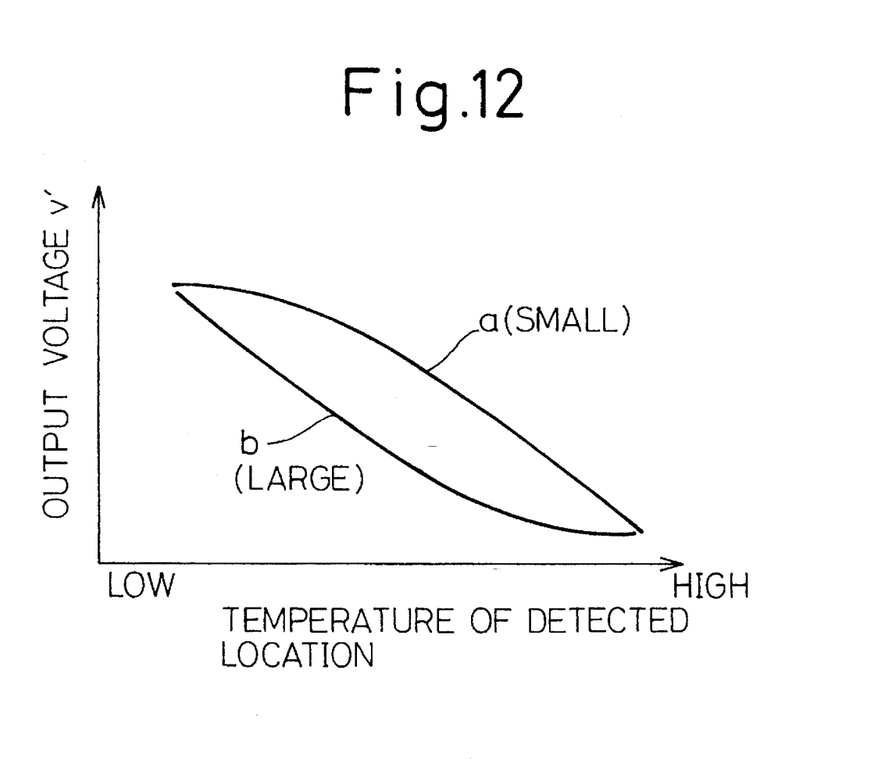
FIG. 12 is a graph showing the relationships between temperature and the output voltage.

FIG. 12 shows the relationship between the temperature of the detecting portion 30 and the output voltage $v'(v'_a)$. In FIG. 12, the curve a shows the relationship when the resistance value of the pull-up resistor 308 is small, while a curve b shows the relationship when the resistance value of the pull-up resistor 308 is large. As will be seen from FIG. 12, when the temperature is high, setting a small value of the pull-up resistor as shown by a curve a can provide a linear relationship between the temperature and the output voltage v', which can increase the precision of the detection of the temperature, since a large change in the detected voltage is obtained with respect to a fixed change in the temperature. Contrary to this, when the temperature is low, a setting of a large value of the pull-up resistor as shown by a curve b can provide a linear relationship between the temperature and the output voltage v', which can also increase the precision of the detection of the temperature, since a large change in the detected voltage is obtained with respect to a fixed change in the temperature.

According to the invention in FIG. 10, in the temperature detecting section 30, in addition to the detecting resistor 303 as a thermistor, the pull-up resistor 308 as a thermistor is provided. As a result, when the temperature of the temperature detecting section 30 is low, the resistance value of the pull-up resistor 308 become large, while, when the temperature of the temperature detecting section 30 is high, the resistance value of the pull-up resistor 308 become small. As a result, a linear relationship between the temperature and the output voltage can be obtained throughout the entire range of the temperature. Thus, an increased precision of the detected value of the temperature can be obtained, since a large change in the detected voltage is obtained with respect to a fixed change in the temperature. Such a change in the voltage is determined in accordance with the ratio between the value of the resistance of the temperature detecting resistor 303 at the respective temperatures and the value of the resistance of the pull-up resistor 308. The values of the resistance of the temperature detecting resistor 303 as well as of the pull-up resistor 308 are determined by the B-constant values of the materials constructing the thermistors. As is well known, the value of such a B-constant is determined by the following equation, $$B = \frac{1}{\frac{1}{T} - \frac{1}{T_0}} \times \ln \frac{R(T)}{R_0(T_0)}, \quad (7)$$

where R(T) is the value of the resistance at the absolute temperature T(°K.), and $R_0(T_0)$ the value of the resistance at the absolute temperature $T_0$(°K.). Generally, the smaller the value of the change in the resistance with respect to the temperature, the smaller the value of the R(T) and $R_0(T_0)$.

Figure 13:
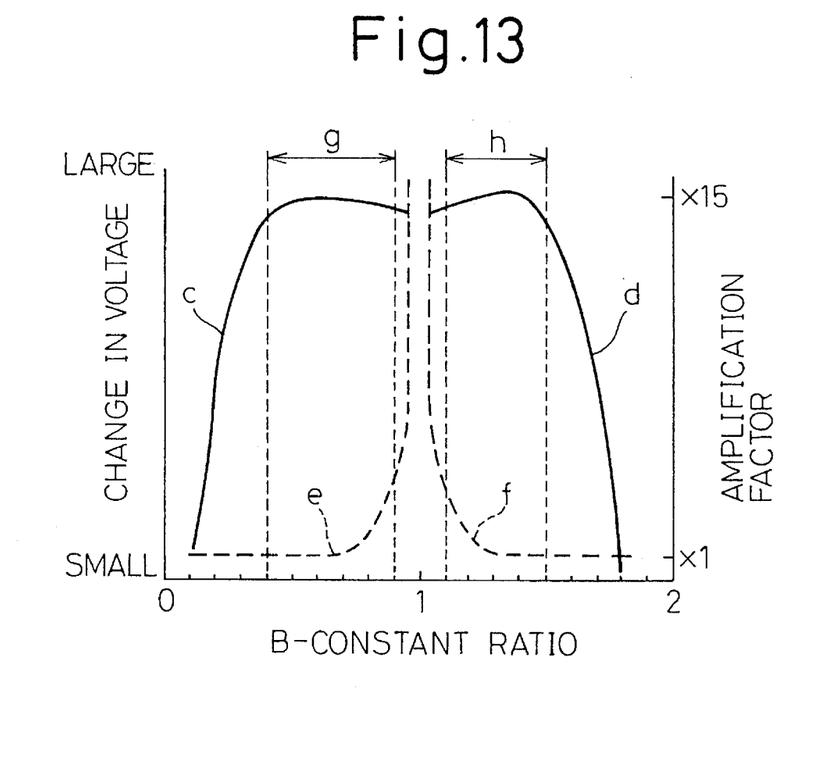
FIG. 13 is a graph showing relationships between a B-constant ratio and a change in a voltage level or an amplifier ratio.

In FIG. 13, the abscissa is the B-constant ratio, which is the ratio of the value of the B-constant of the temperature detecting resistor 303 and the value of the B-constant of the pull-up resistor 308. The ordinate on the right-hand side is the amplifying ratio of a scaling amplifier which gives a value of the change in the voltage with respect to the temperature change in such a manner that a range of 0.1 to 1 Volt in voltage change corresponds to a range of 100° to 1,000° C. in temperature change. The ordinate on the left hand side shows a change in the electric voltage, after scaling, with respect to the temperature change. Curves shown by solid lines are the relationships between the value of the B-constant and the value of the amplifying ratio, while curves shown by dotted lines are the relationships between the value of the B-constant and the value of the change in the electric voltage. Namely, in FIG. 13, c is the value of the electric voltage change when the value of the B-constant is smaller than 1.0, while d is a value of the electric voltage change when the value of the B-constant is larger than 1.0.

Furthermore, in FIG. 13, e is the value of the amplifier ratio of the scaling amplifier when the value of the B-constant is smaller than 1.0, while f is the value of the amplifier ratio of the scaling amplifier when the value of the B-constant is larger than 1.0.

As will be seen from FIG. 13, it is possible that a suitable selection of the value of the B-constant makes it possible to obtain the maximum change in the voltage value with respect to the change in the temperature, i.e., to increase the sensitivity of the sensor. Furthermore, it can also be seen from FIG. 13 that a value of the B-constant around 1.0 makes the scaling amplifier ratio excessively large, which makes the system impractical. As is well known, the value of the B-constant can have a certain fluctuation, which can vary the change in the voltage, which causes the precision of the detection of the temperature to be reduced. However, according to the second invention, the range in the value of the B-constant between 0.4 to 0.9, as designated by g, or between 1.1 to 1.5, as designated by h, can give a large change in the voltage which is substantially unchanged with respect to the change in the value of the B-constant, resulting in an increase in the precision of the measurement of the temperature.

In view of the above, a suitable selection of the values of the temperature measuring resistor 303 and the pull-up resistor 308 to obtain the range in the value of the B-constant between 0.4 to 0.9 or between 1.1 to 1.5 can give a stabilized the change in the voltage irrespective of a fluctuation of the value of the B-constant of the temperature measuring resistor 303 and of the pull-up resistor 308, thereby obtaining an increased precision of the measurement of the temperature.

In the above embodiment in FIG. 10, two different thermistors (303 and 308) are arranged on one and the same electric insulative ceramic substratum and one of the thermistors is a temperature measuring resistor, while the other thermistor is a pull-up resistor. However, the present invention is not limited to this version. Namely, one of the thermistors can be arranged on an electric insulative ceramic substratum, while the other thermistor can be arranged on another electric insulative ceramic substratum. Then, these substratum plates are laid one above the other, while means such as throughholes are provided for electrically connecting electrodes to the respective thermistors so that the same circuitry as shown in FIG. 10 is constructed. Furthermore, another construction is also possible wherein electrodes from the respective thermistors are connected with each other at locations outside the thermistors.

Figure 14:
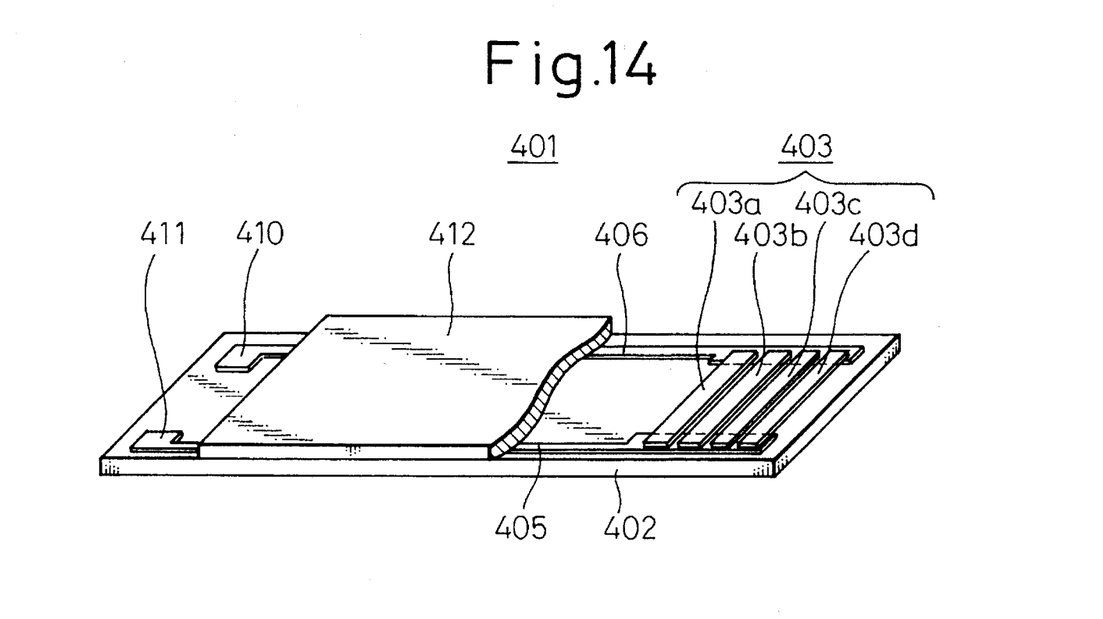
FIG. 14 is a schematic, partial exploded, schematic view of a sensor according to the present invention.

FIG. 14 illustrates a thermistor type temperature sensor according to the third aspect of the invention. In FIG. 14, reference numeral 402 denotes a substratum made of electric insulative ceramic material such as alumina. On the substratum 402, a thermistor 403 made of material such as Mn-Cr based spinel is formed. Furthermore, lead electrodes 405 and 406, and terminal electrodes 410 and 411 made as a precious metal such as Pt or high temperature resistant metal material are formed on the substratum 402. A cover 412 is connected to the substratum 402 to cover the thermistor 403. The thermistor 403 is constructed from divided four elements 403a to 403d, which are connected in parallel between the electrodes 405 and 406, and which are the same length l, width w and thickness t. Furthermore, each of the element 403a to 403d has the same ratio of components. Similar to the previous embodiments, on a green ceramic sheet of the substratum 402, screen printing of a paste of the precious material or high-temperature-resistant metal such as Pt is performed to obtain the electrodes 305 and the electrodes 407 and 410, and screen printing of a paste of an Mn-Cr spinel-based material is performed to obtain the thermistor 403, so that the thermistor material partially overlaps the electrode material. Then, a cover 412 made of a green sheet of electric insulating material is laid on the plate 402, and subjected to firing, to give an integrated plate 401.

The resistance of the thermistor is expressed by:

$$R = \frac{1}{\frac{1}{R_a} + \frac{1}{R_b} + \frac{1}{R_c} + \frac{1}{R_d}}, \quad (8)$$

where $R_a$, $R_b$, $R_c$ and $R_d$ represent the resistance values of the thermistors 403a to 403d, respectively. In this case, the resistances are expressed by:

$$R_a = R_{AV} + \Delta R_a \quad (9\text{-}1)$$

$$R_b = R_{AV} + \Delta R_b \quad (9\text{-}2)$$

$$R_c = R_{AV} + \Delta R_c \quad (9\text{-}3)$$

$$R_d = R_{AV} + \Delta R_d \quad (9\text{-}4),$$

where $R_{AV}$ is an average resistance value of the temperature detecting thermistors 403a to 403d and $\Delta R_a$, $\Delta R_b$, $\Delta R_c$ and $\Delta R_d$ are deviations from the average value. As well known, the deviations $\Delta R_a$, $\Delta R_b$, $\Delta R_c$ and $\Delta R_d$ have a normal distribution, so that a summation of these value is approximately zero, i.e., $$\Delta R_a + \Delta R_b + \Delta R_c + \Delta R_3 \approx 0 \quad (10)$$

In view of the above equations (9-1) to (9-4), the equation (8) becomes $$R = \frac{1}{\frac{1}{R_{AV} + \Delta R_a} + \frac{1}{R_{AV} + \Delta R_b} + \frac{1}{R_{AV} + \Delta R_c} + \frac{1}{R_{AV} + \Delta R_d}} \quad (11)$$

$$\approx \frac{1}{\frac{4}{R_{AV}} + (\Delta R_a + \Delta R_b + \Delta R_c + \Delta R_d)}$$

$$\approx \frac{R_{AV}}{4} + \frac{\Delta R_a + \Delta R_b + \Delta R_c + R_d}{16}$$

In the above equation the term $$\frac{\Delta R_a + \Delta R_b + \Delta R_c + R_d}{16}$$

indicates the degree of the variation of the detected value by the thermistor according to the present invention, which is approximately zero, as explained with reference to the equation (10). Furthermore, the design values of the divided resistors is the value of the thermistor 401 multiplied by 4.

Contrary to this, in the Japanese Patent Publication 5-34208, a prior art, two different kind of thermistors providing different resistance value between an high and low temperature conditions are arranged in parallel. In such a parallel arrangement, the variation of the thermistor is determined by the thermistor element with a larger variation in value between the two elements. Thus, this prior art construction can not reduce the variation in the thermistor resistance value.

Figure 15:
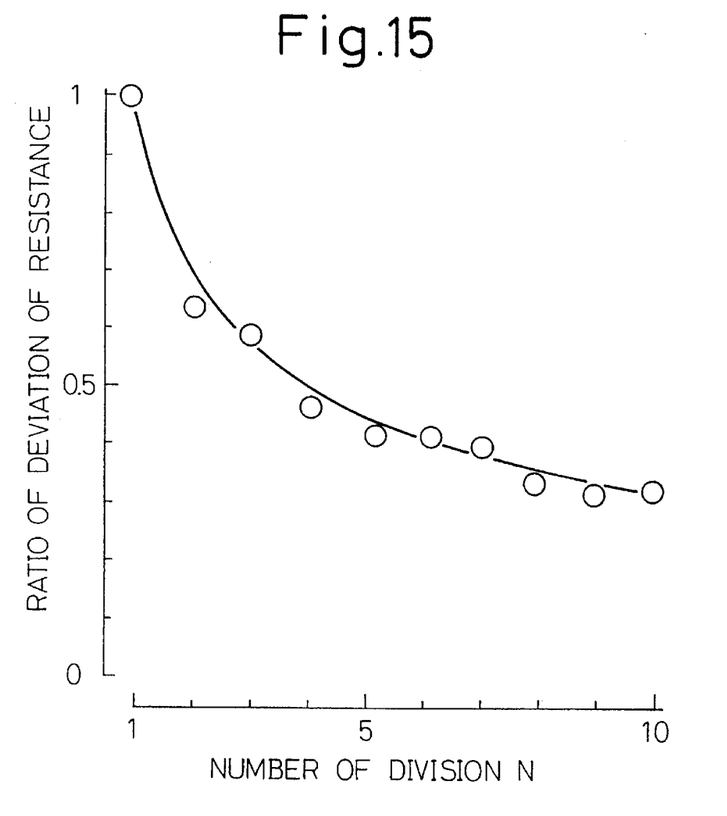
FIG. 15 is a graph showing a relationship between the number of divisions and a variation in the resistance value.

In the above embodiment in FIG. 14, the number of the independent thermistor elements 403a to 403d, which are in parallel, is four, which does not necessarily limit the present invention. Namely, FIG. 15 shows the relationship between the number of the divisions and the ratio the variation (nominal variation) in the resistance of the divided thermistor to the variation in the resistance value of a non-divided thermistor. This variation ratio decreases in accordance with an increase in the number N of the divisions. Namely, the value of the ratio is roughly proportional to $$\frac{1}{\sqrt{N}}.$$

As explained above in the third invention in FIGS. 14 and 15, the temperature detecting thermistor of the same composition is divided, so that thermistor elements of the same composition are obtained, which can reduce the variation in the resistance value of the thermistor as combined. As a result, an increase in the precision in temperature detection by the thermistor can be realized. Furthermore, individual checking of the variation in the detected value of the thermistor element become unnecessary, which causes a productivity to be enhanced.

In the above embodiment, in FIGS. 14 and 15, one and the same thermistor is divided into a plurality of sections, which are connected in parallel. However, a construction can also be employed where a plurality of divided sections are connected in series with each other, to obtain substantially the same function and effect. In case where sections of number of N are connected in series, the value of the resistance of one sectioned thermistor is 1/N of the resistance value of the temperature sensor. As a result, a material of a lower specific resistance, such as $Cr_2O_3$-ZnO, is preferable for the thermistor.

In the above embodiment of the third invention in FIG. 14, the same thermistor is divided into sections which are connected in parallel or in series. In place of this construction, a plurality of thermistors constructed from the same composition may be formed on separate substratum plates, which are laid one above the other and fired to provide an integrated construction. Furthermore, a thermistor of the same composition may be formed on different electric insulative ceramic substratum and connected to respective terminals which are at locations outside the sensor.

Figure 16:
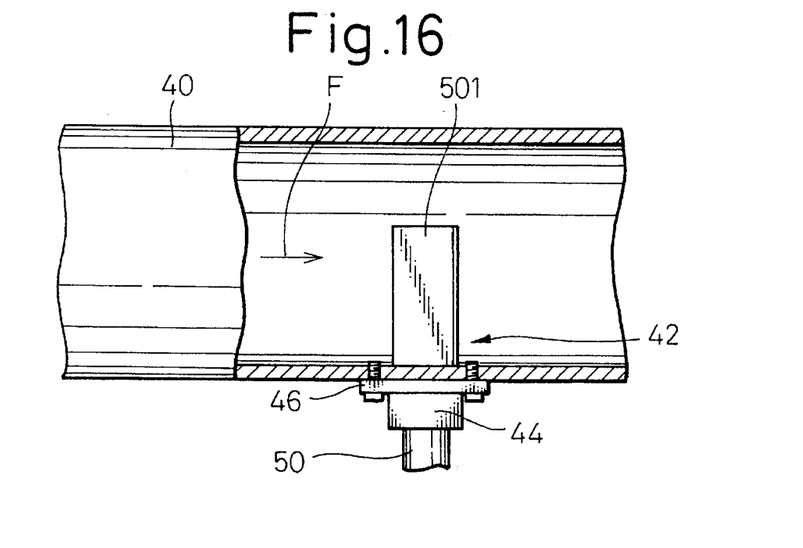
FIG. 16 shows an arrangement of the sensor in FIG. 14 in an exhaust pipe of an internal combustion engine.
Figure 17:
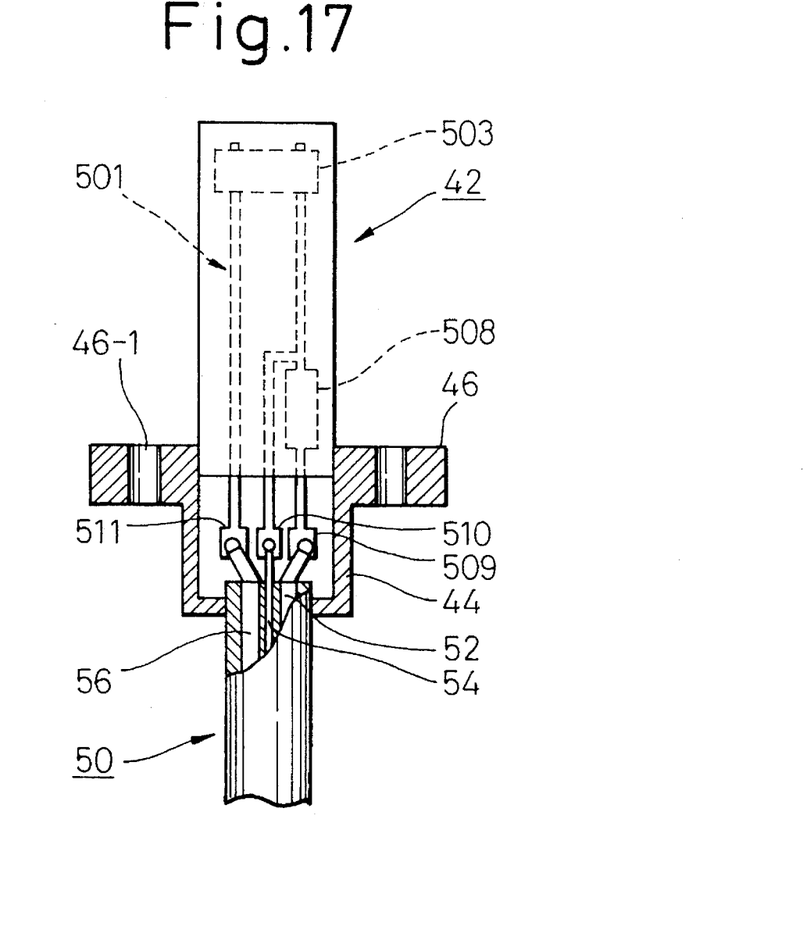
FIG. 17 is a sectional view of the sensor in FIG. 16.
Figure 18:
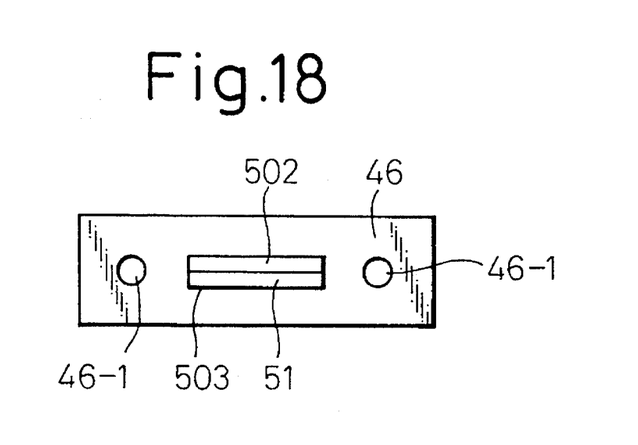
FIG. 18 is an end view of the sensor in FIG. 17.
Figure 19:
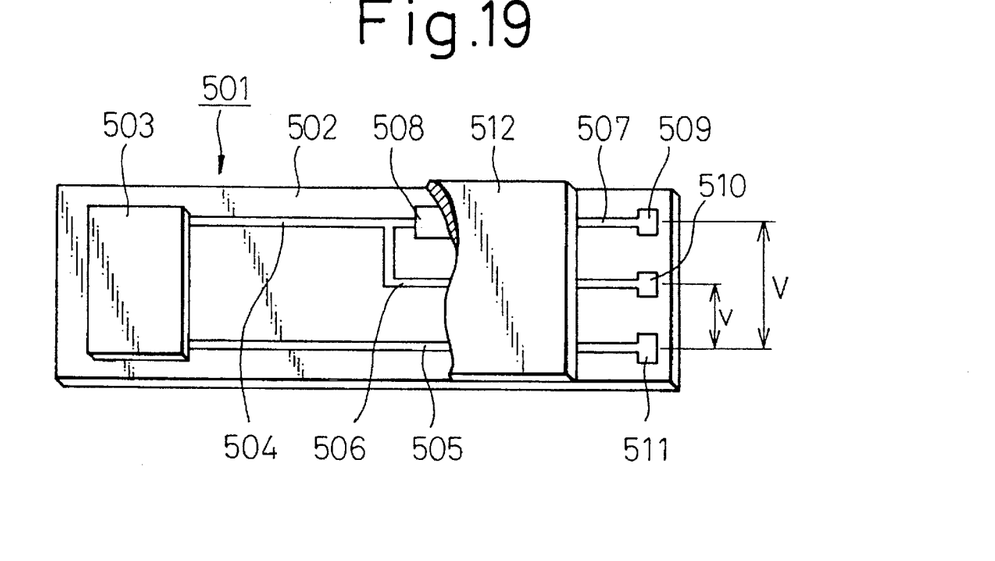
FIG. 19 is a schematic, partially exploded plan view of a sensor according to the present invention.

Next, a fourth invention will be explained. FIG. 16 illustrates an exhaust pipe 40 on which a temperature sensor 42 according to the present invention is mounted. Namely, the sensor 42 is provided with a housing 44 having a flange 46, which as shown in FIGS. 15 and 16, defines a pair of holes 46-1, through which bolts are inserted for connecting the housing 44 to the exhaust pipe 40. Arranged in the housing is a thermistor 501, which is constructed as shown in FIG. 19. As in the previous embodiments, the thermistor 501 is formed of a substratum 502 made from a green sheet of an electric insulative ceramic material, such as alumina, on which a paste of Mn-Cr spinel for constructing a temperature measuring resistor 503 as a temperature measuring thermistor, a paste of $Cr_2O_3$ based material for constructing the outlet detecting (pull-up) resistor 508, and a paste of precious or high temperature durable metal, such as Pt for constructing lead electrodes 504 to 507 and terminal electrodes 509 to 511 are printed. A green sheet of an electric conductive ceramic material such as alumina, as a cover plate 512 is then applied to the printed substratum 502, so that the plates 502 and 512 are integrated, and then the integrated plates are fired to obtain the final thermistor. As shown in FIG. 17, a connecting cable 50 for electrically connecting the sensor 42 with a control circuit (not shown) for an internal combustion engine is provided. The thermistor 501 is connected to the housing 44. The cable 50 includes wires 52, 54 and 56, which are connected to the terminal electrodes 509, 510 and 511, respectively, and electric insulating sheaths for holding and separating the wires 52, 54 and 56.

Figure 20A:
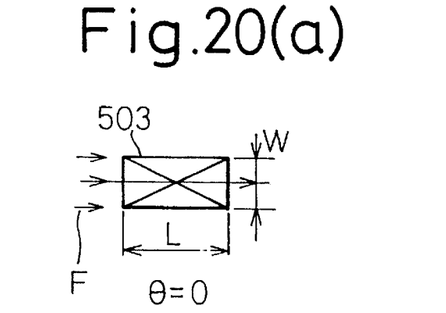
FIGS. 20(a) to 20(d) illustrate various arrangements of the sensor element with respect to the flow of the gas to be detected.
Figure 20B:
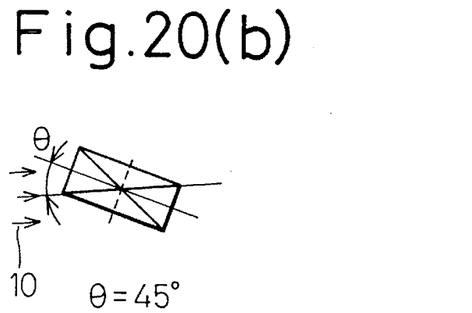
Figure 20C:
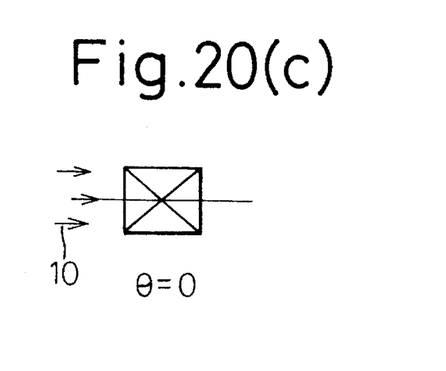
Figure 20D:
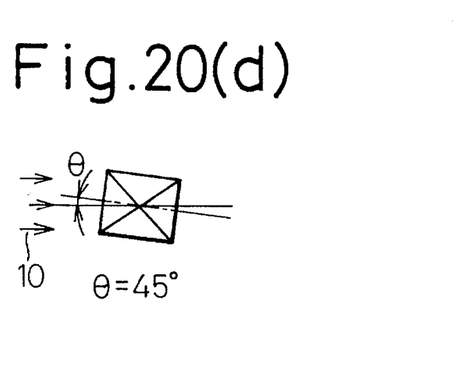

According to the present invention, the thermistor element 503 of the thermistor 501 of the temperature sensor 42 is arranged in the exhaust pipe 40 of the internal combustion engine, and the temperature detection response time is measured, while the arrangement of the sensor element 503 with respect to the direction of the flow of the exhaust gas is varied. Namely, in FIGS. 20(a) to (d), the transverse cross section of the thermistor element 503 is shown. Thus, the element 503 has a transverse length L and a thickness W. F shows the direction of flow of the exhaust gas, which is in parallel with respect to the major plane of the thermistors. In FIGS. 20(a) and (b), the ratio of the length L to the thickness W is 2.0. In FIG. 20(a), the angle θ of the thermistor element 503 (the major plane of the thermistor) with respect to the direction of the flow of the exhaust gas is zero. In FIG. 20(b), the element is tilted so that the angle θ of the major plane of the thermistor with respect to the direction of the flow of the exhaust gas is 45 degrees. In FIGS. 20(c) and (d), the ratio of the length L to the thickness W is smaller than 2.0. In FIG. 20(c), the angle θ is zero degrees, while, in FIG. 20(d), the angle θ is 45 degrees.

Figure 21:
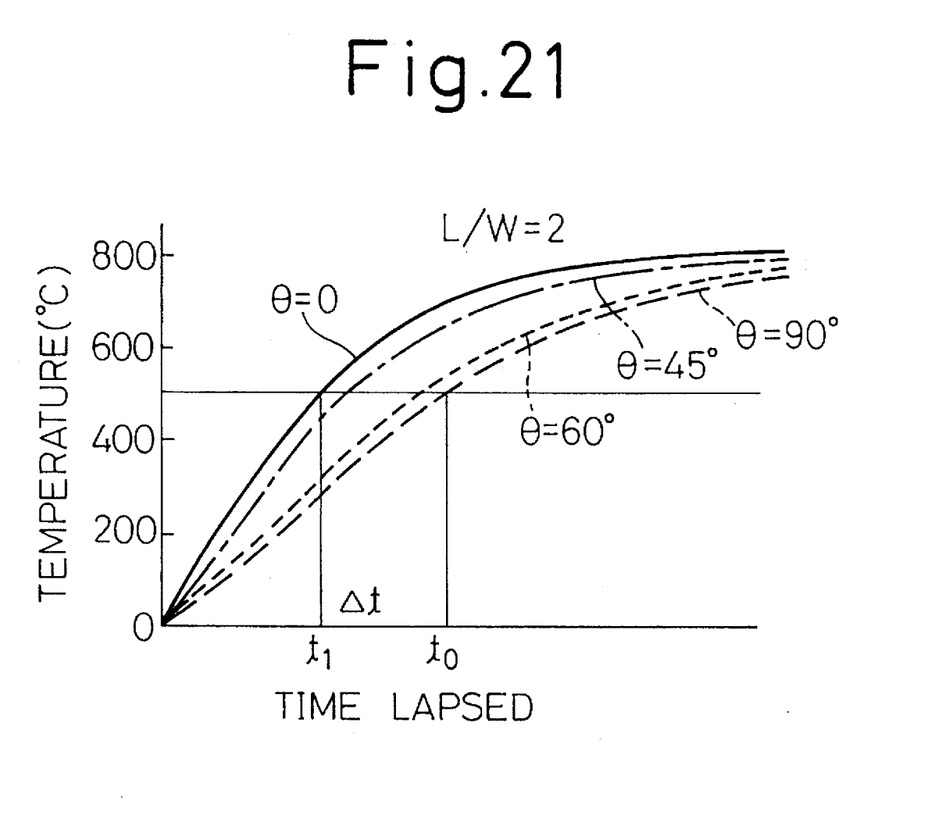
FIG. 21 is a graph showing relationships between time and the temperature as detected by the sensor.

FIG. 21 shows time response characteristics for the various values of the angle θ of the thermistor element when $$\frac{L}{W} = 2.0,$$

which show changes in the detected temperature with respect to the time after the commencement of the temperature measurement. As will be seen from the relationships in FIG. 21, an increased temperature measuring response can be obtained when the angle θ is 45 degrees or less. Furthermore, the maximum response is obtained when the angle θ is zero, i.e., the longer side of the thermistor element is parallel to the direction of flow of the exhaust gas. This is because the area of the surface of the thermistor over which the exhaust gas does not flow is a minimum, causing the area of the heat receiving surface to be the maximum.

In this embodiment of the fourth embodiment, as shown in FIG. 16, the arrangement of the thermistor element 503 is such that its major surface forms an angle θ which is smaller than 45 degrees with respect to the flow of the exhaust gas, thereby obtaining an increased measuring response. Namely, when the sensor 42 is mounted onto the exhaust pipe by means of the flange 46 which is connected to the wall of the exhaust pipe by using the bolts inserted to the respective openings 46-1 and screwed to the wall, the major surface of the thermistor 503 is at an angle θ which is smaller than 45 degrees with respect to the direction of the flow of the exhaust gas.

Figure 22:
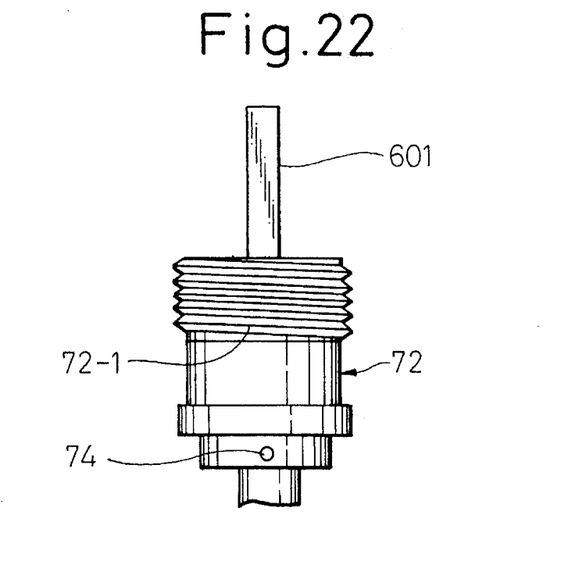
FIG. 22 is a side view of the sensor in another embodiment.
Figure 23:
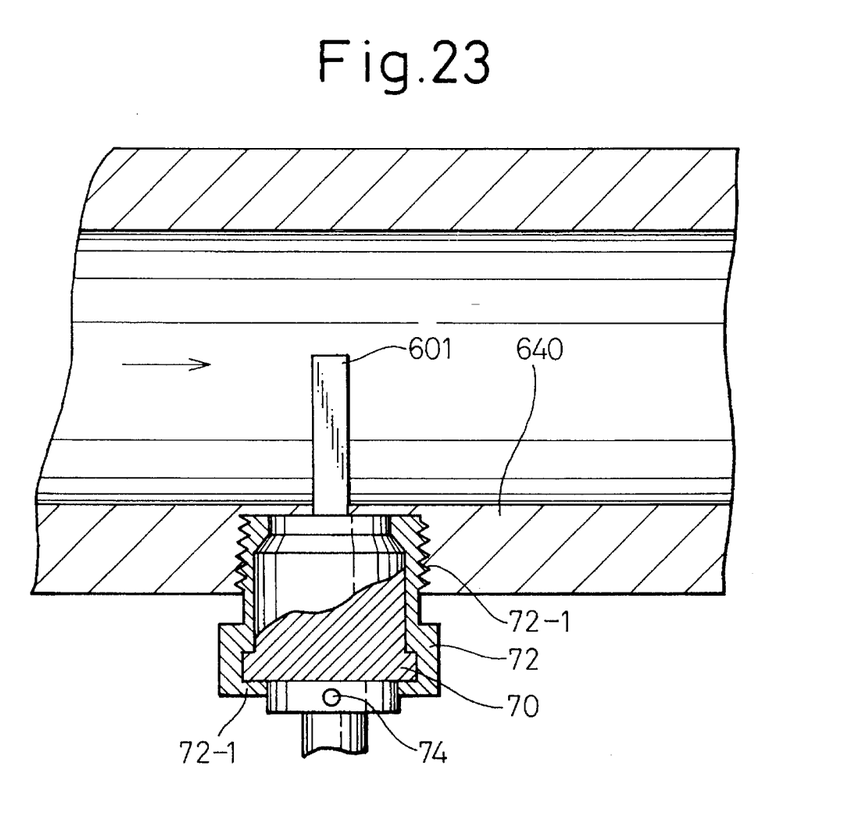
FIG. 23 shows how the sensor in FIG. 22 is attached to an exhaust pipe of an internal combustion engine.

FIGS. 22 and 23 show another embodiment. A thermistor 601 is held inside an inner housing 70, which is inserted into an outer housing 72 and which is connected to the latter by crimping its outer end 72-1. In this case, the outer housing 72 is rotatable with respect to the inner housing 70. The outer housing 72 has a screw thread 72-1 which is screwed to a screwed opening in the exhaust pipe 640. Then, the inner housing 70 is rotated until an outwardly visible marker 74 is located at a desired position which indicates that the thermistor 601 is be located in such a way that its major plane makes an angle θ with respect to the direction of the flow of the exhaust gas which is smaller than 45 degrees. As a result, an advantage is obtained which is similar to that obtained in the embodiment in FIG. 16.

In the above embodiment of the fourth aspect of the invention, a thermistor is used as an element for measuring the temperature. However, another plate-shaped element may be employed if it issues an electric signal indicative of the detected temperature. Furthermore, in place of the cable 50, other any means can be employed if it can carry a signal. Finally, in place of the housing 44, any means can be employed if it makes it possible to arrange the sensor so that the major detecting plane is arranged at an angle equal to or smaller than 45 degrees with respect to the direction of the flow of the gas.

We claim:

1. A thermistor type temperature sensor, comprising:

a substrate plate made of an electrically insulating ceramic material;

a thin or thick layer of a thermistor material constructing a first resistor, the resistance value of which varies in accordance with the temperature to be detected;

a thin or thick layer of a trimmable second resistor for allowing a change in the resistance value of said first resistor to be detected;

said first and second resistors being integrally formed on said substrate; and trimmable resistor means connected to said first and second resistors for canceling an offset of the detected resistance value, said trimmable resistor means comprising a third resistor which is in series with said first resistor and a fourth resistor which is in parallel with said first resistor.

2. A method for producing a thermistor type sensor comprising the steps of:

providing a substratum plate made of electric insulative ceramic material;

providing, on the substratum, a thin or thick layer of a thermistor material constructing a first resistor, the resistance of which varies in accordance with the temperature to be detected;

providing, on the substratum, a thin or thick layer of trimmable second resistor for allowing a change in the resistance value of the first resistor to be detected;

trimming the second resistor so that a desired resistance value of the second resistor is obtained; and providing trimmable resistor means connected first and second resistors for canceling an offset of the detected resistance value, said trimmable resistor means comprising a third resistor which is in series with said first resistor and a fourth resistor which is in parallel with said first resistor.

3. A method according to claim 2, further comprising the steps of providing, on the substrate, trimmable auxiliary resistors as thin or thick films, and trimming the auxiliary resistors, so that desired relationship between the resistances of the first and second resistors is obtained.

4. A thermistor type temperature sensor, comprising:

a substratum made of electric insulative material;

a thin or thick layer of a thermistor material constructing a first resistor, the resistance value of which varies in accordance with the temperature to be detected; and a second resistor for allowing an output voltage to be produced, which indicates a change in the resistance value of the first resistor;

said first and second resistors being formed integrally on said substratum;

a thermistor B-constant ratio, being a ratio of a B-constant value of the first resistor to the B-constant value of the second resistor, being within a range between 0.4 to 0.9 or between 1.1 to 1.5.

5. A thermistor type temperature sensor, comprising:

a substratum plate made of electric insulative ceramic material;

a thin or thick layer of a thermistor material constructing a detecting resistor, the resistance of which varies in accordance with the temperature to be detected;

electrodes connected to the detecting resistor to carry an electric signal corresponding to the detected temperature; and the resistor and electrodes being formed on the substratum;

the detecting resistor being constructed from a plurality of temperature detecting sections for sensing substantially identical temperature ranges and having substantially the same compositions and dimensions and being connected in series or in parallel with the electrodes.

6. A thermistor type temperature sensor, comprising:

a substratum plate made of electric insulative ceramic material;

a thin or thick layer of a thermistor material constructing a detecting resistor, a resistance of which varies in accordance with the temperature to be detected;

electrodes connected to the detecting resistor for carrying an electrical signal corresponding to the detected temperature, the resistor and electrodes being formed on the substratum;

the detecting resistor being constructed from a plurality of temperature detecting sections for sensing substantially identical temperature ranges and made of substantially the same compositions and dimensions and connected with each other; and an electric insulative cover for covering the divided temperature detecting sections.

7. A sensor according to claim 6, wherein the detecting sections are connected in series or in parallel with the electrodes.

* * * * *